United States Patent [19]

Ridenour

[11] 4,442,586
[45] Apr. 17, 1984

[54] TUBE-TO-TUBE JOINT METHOD

[76] Inventor: Ralph G. Ridenour, 626 Lexington-Ontario Rd., Mansfield, Ohio 44903

[21] Appl. No.: 263,493

[22] Filed: May 14, 1981

Related U.S. Application Data

[60] Continuation of Ser. No. 951,579, Oct. 16, 1978, Pat. No. 4,269,438, which is a continuation-in-part of Ser. No. 527,683, Nov. 27, 1974, Pat. No. 4,200,314, which is a division of Ser. No. 425,561, Nov. 17, 1973, abandoned.

[51] Int. Cl.³ .................. B21D 39/00; B23P 11/02
[52] U.S. Cl. ........................ 29/511; 29/523; 29/243.52; 29/520
[58] Field of Search ............ 29/511, 523, 520, 243.52; 285/382, 382.5

[56] References Cited

U.S. PATENT DOCUMENTS

| 1,802,538 | 4/1931 | Rych | 29/523 X |
| 2,434,080 | 1/1948 | Rosa | 29/523 X |
| 2,477,676 | 8/1949 | Woodling | 29/523 UX |
| 2,648,123 | 8/1953 | Phillips | 29/511 |
| 3,210,102 | 10/1965 | Joslin | 29/523 X |
| 3,467,414 | 9/1969 | Downing | 29/511 X |
| 3,942,825 | 3/1976 | Balon | 29/523 X |
| 4,006,524 | 2/1977 | Frank | 29/523 X |

Primary Examiner—Charlie T. Moon
Attorney, Agent, or Firm—Pearne, Gordon, Sessions, McCoy, Granger & Tilberry

[57] ABSTRACT

A joint is provided between one tube and another tube without the necessity of a heavy thick-walled metal coupling. The joint includes first and an optional second enlarged portions on a first tube with the second enlarged portion near an end of the second tube. A first shoulder is provided between the first enlarged portion and the main body of the first tube. A second annular shoulder is provided at the junction between the first and second enlarged portions. The end of the second tube slips into the first enlarged portion of the second tube and the second tube is then axially compressed so as to form an annular bead which acts against and is contained by the second enlarged portion of the first tube. This axial compression provides both a mechanical interconnection so that the tubes will not axially separate despite fluid pressure or mechanical force, and also provides a fluid tight seal at the annular bead and the second shoulder or second enlarged portion. The foregoing abstract is merely a resume of one general application, is not a complete discussion of all principles of operation or applications, and is not to be construed as a limitation on the scope of the claimed subject matter.

14 Claims, 15 Drawing Figures

TUBE-TO-TUBE JOINT METHOD

CROSS REFERENCES TO RELATED APPLICATIONS

This application is a division of application Ser. No. 951,579, filed Oct. 16, 1978, now U.S. Pat. No. 4,269,438, issued May 26, 1981, which is a continuation-in-part of my prior application Ser. No. 527,683, filed Nov. 27, 1974, now U.S. Pat. No. 4,200,314, issued Apr. 29, 1980, which is a division of my prior application Ser. No. 425,561, filed Nov. 17, 1973, now abandoned.

BACKGROUND OF THE INVENTION

Joints in tube fittings have been made in a number of different varieties and for many different uses. The typical joint is one wherein a tube is connected into a thick-walled metal body called a coupling or a fitting and then an orifice within this thick-walled body conveys the fluid to some utilization device or connects to still another tube for further transfer of the fluid. Such couplings or fittings are large, bulky, require considerable machining, and hence are relatively expensive.

Welded joints between two tubes have previously been used but this requires considerable equipment, either gas welding or electric welding. Further, such welding is not suitable for many metals, for example, aluminum. Aluminum is a metal which does not appreciably change color as it is heated so that it is difficult for the welder to determine when the metal has reached the proper welding temperature. If the welding temperature is just slightly exceeded, the metal rapidly droops and then runs away as a liquid. Still further, aluminum as it is heated very readily oxidizes and the aluminum oxide coating is a very good insulator which inhibits a satisfactory weld. This means that usually some shielded arc or inert gas atmosphere must surround the weld, thus still further complicating and increasing the cost of such weld.

Many tube joints are subjected to an adverse environment, for example, in the use of air conditioning assemblies in automobiles. The refrigerant used in the air conditioning units is rather corrosive and over a period of time appears to attack almost all packing or sealing material in the tube joints, thus eventually causing leaks. Additionally, the temperature range within the engine compartment of a modern automobile is as much as 200° F., from below 0 to near 200 degrees. Still further, there is considerable vibration both from the engine and from road shocks. The combination of these factors has caused the use in automotive air conditioners of tube joints which are rather expensive to manufacture and to assemble, in man hours of labor. Additionally there are millions of such automotive air conditioners manufactured each year with many joints to be made for each air conditioner, and thus the industry is quite anxious to obtain a tube joint which is not only economical to use and manufacture but also reliable so that expensive warranty work is not needed. Retrofitting a defective joint in an existing automobile out in the field is far more expensive than the total cost of all fittings on the entire automotive air conditioner in the first instance. Hence the industry is not interested in a cheap fitting which does not maintain its integrity under the severe conditions encountered.

The air conditioning industry would also like to use aluminum tubing because it is lightweight yet strong, but aluminum has traditionally been a difficult metal to join with another structure, one reason being that it is initially ductile but rapidly becomes work hardened.

The prior art has known tube joints with a flange or an annular bead, including those fittings where such bead acted against a resilient packing member, or where a flared end on the tube coated with a coupling. However most of these fittings were reusable fittings of the two piece type such as an interthreaded nut and fitting connection. These are expensive to manufacture and time consuming to assemble. Where it is not necessary that the joint be disassembled after initial assembly, the prior art has known of fittings which are assembled by an internal mandrel expanding the tube against a wall of the fitting. In this case the outwardly swaged tube is moved into engagement with a previously prepared aperture in the thick-walled fitting. It takes several steps to prepare the proper shape of this fitting to receive the tube. Then a further three or four step process is required to use a mandrel and die to outwardly swage the tube and finish the process of connecting the tube to the thick-walled fitting. Accordingly, the problem to be solved is how to construct a tube joint and the method of assembling the same so as to overcome the economic and practical disadvantages of the prior art.

SUMMARY OF THE INVENTION

The problem is soled by utilizing a tube-to-tube joint comprising in combination: A first tube and a second tube each having an outer wall and an inner wall, said second tube having a main body and having an end portion, said first tube having a first portion near one end thereof telescoped relative to said end portion of said second tube, means establishing a first shoulder fixed relative to said first tube and of a radius substantially equal to the radius of the end of said second tube, means establishing a second shoulder on said first portion of said first tube closer to said one end of said first tube than said first shoulder, each of said shoulders being transverse to the axis of said first tube, said first tube portion inner wall being substantially cylindrical and having a diameter slightly larger than the nominal diameter of the outer wall of said second tube end portion, said second tube end portion being telescoped inside said first portion of said first tube with the end portion of said second tube abutting said first shoulder, at least a first annular area on said second tube inner wall being bulged outwardly and forming a radially enlarged bead on the outer wall of said second tube, fluid seal means acting between said annular bead and one of said shoulders, and said first portion of said first tube having a wall thickness substantially equal to the wall thickness of said main body of said first tube.

The problem is further solved by the method of making a tube-to-tube joint directly between first and second tubes, and utilizing mandrel means and first and second die means, comprising the steps of, grasping the first tube with the first die means, moving the mandrel means and the first die means relatively axially together to form in one end of the first tube a radially enlarged first portion and to form a first shoulder at the junction between said enlarged first portion and the main body of the first tube, said enlarged first portion having an inner diameter slightly larger than the nominal outside diameter of one end of the second tube, removing the mandrel means, grasping the second tube near an end thereof with the second die means, relatively axially moving together the grasped tubes to cause said end of the second tube to enter said enlarged first portion of the first tube and to abut said first shoulder and continued axial relative movement causing at least a first annular portion of the inner wall of the second tube to bulge outwardly as an annular bead, forming a second shoulder in said first tube by one of said mandrel means and said relative axial movement, and continued relative axial movement between the grasped tubes establishing fluid seal means between said annular first portion of the inner wall of the second tube and said second shoulder.

An object of the invention is to provide a tube joint which is economical both in manufacture and assembly and yet will seal high fluid pressures.

Another object of the invention is to provide a tube joint which may be used with many different materials and with various tolerances on the structural parts yet which will seal high fluid pressures.

Another object of the invention is to provide a tube joint which will maintain sealing integrity despite wide variations in temperature, vibration and pressure.

Another object of the invention is to provide a method of assembly of a tube joint wherein one tube may be directly connected to another tube without use of some intermediate thick-walled fitting.

Other objects and a fuller understanding of the invention may be had by referring to the following description and claims, taken in conjunction with the accompanying drawing.

DESCRIPTION OF THE PREFERRED EMBODIMENTS

Figure 1:
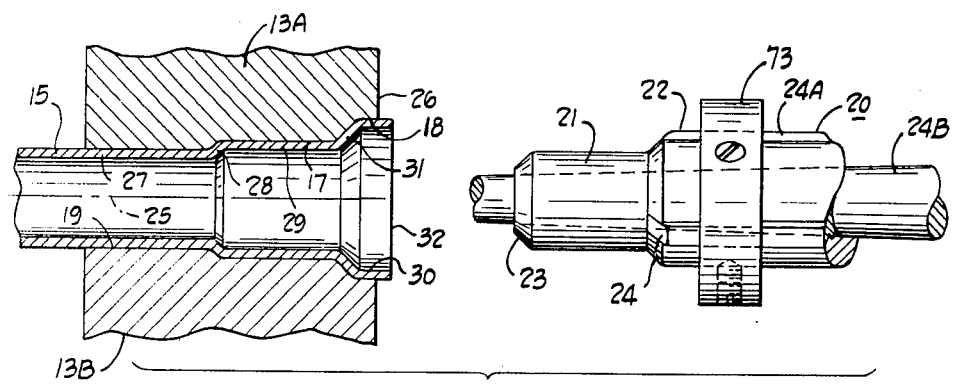
FIG. 1 is a longitudinal sectional view of the method of using a first mandrel in the forming of the tube joint.
Figure 3:
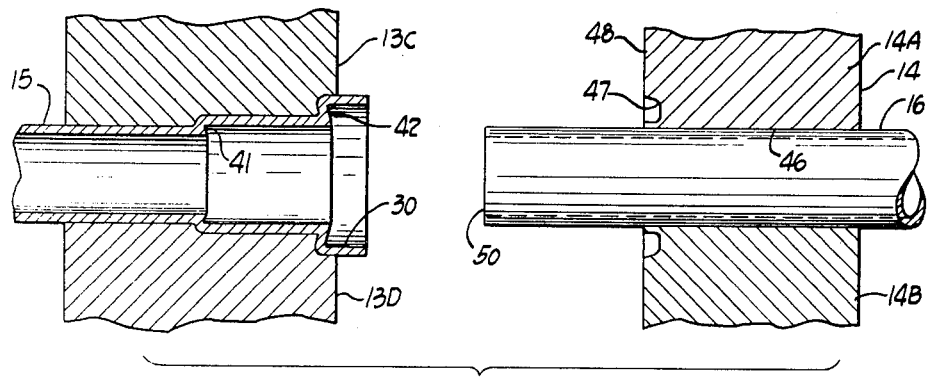
FIGS. 3, 4 and 5 are longitudinal sectional views showing the sequence of steps in the method of assembly of the tube joint.
Figure 4:
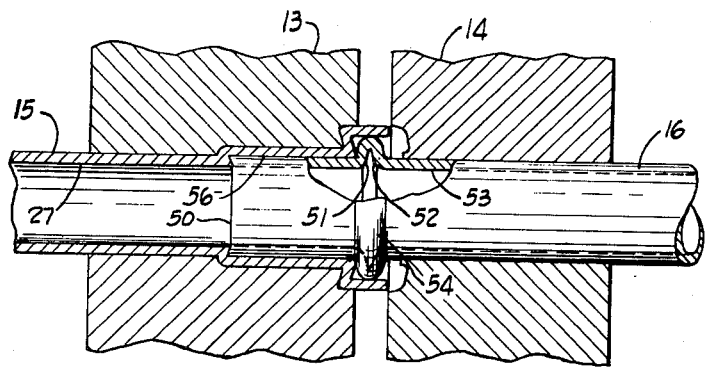
Figure 5:
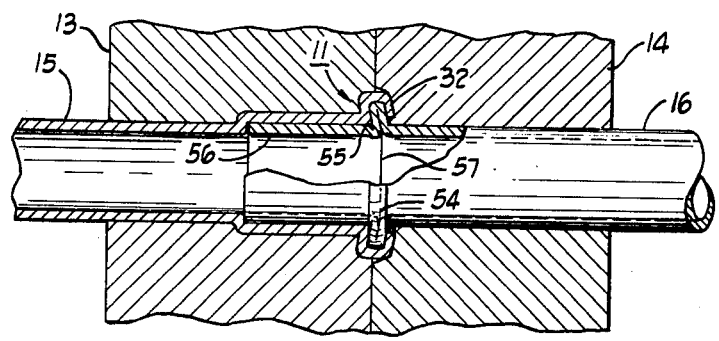

The FIGS. 1–5 show the succession of steps in the method of forming a tube joint 11, shown completed in FIG. 5 except that it is not removed from first die means 13 which grip a first tube 15 and from second die means 14 which grip a second tube 16. The first die means 13 includes a pair of dies 13A and 13B shown in FIG. 1. These may have generally semicylindrical cavities therein to be clamped on the first tube 15. The first die means 13, when closed as shown in FIG. 1, has a first enlarged cavity 17 and a second enlarged cavity 18. A mandrel 20 is generally cylindrical in shape with a first enlarged portion 21 and a second enlarged portion 22. A rounded nose 23 is provided on the forward end of the mandrel 20 and a sloping shoulder 24 is provided to interconnect the first and second enlarged portions 21 and 22.

Initially the first tube 15 is merely a straight cylindrical portion of tube with the end 32 cut off substantially normal to the axis 25 of the tube 15. The mandrel 20 and the first die means 13 may be relatively axially moved together by some force means such as a press, not shown, and preferably the mandrel is rotated relative to the tube 15. This forces the mandrel into the tube 15. The rounded nose 23 permits the enlarged portion 21 to enter the end of the tube and enlarge it so that it is pressed into the first enlarged cavity 17. The sloping shoulder 24 is preferably provided in longitudinally disposed rollers 24A, which are moved outwardly by an axially movable taper pin 24B. These rollers engage the end of the tube and enlarge it so that it is forced against the second enlarged cavity 18.

The tube as thus formed by the mandrel 20 and the first die means 13 is one wherein the tube 15 has a main body portion 27, an enlarged first portion 29 joined to the main body portion 27 by a first shoulder 28 and further has an enlarged second portion 30 joined to the enlarged first portion 29 by a second shoulder 31. The wall thickness at the enlarged portions 29 and 30 is substantially the same as that at the main body portion 27, despite the radial enlargement, because of a slight axial displacement of the tube material at the same time.

Figure 2:
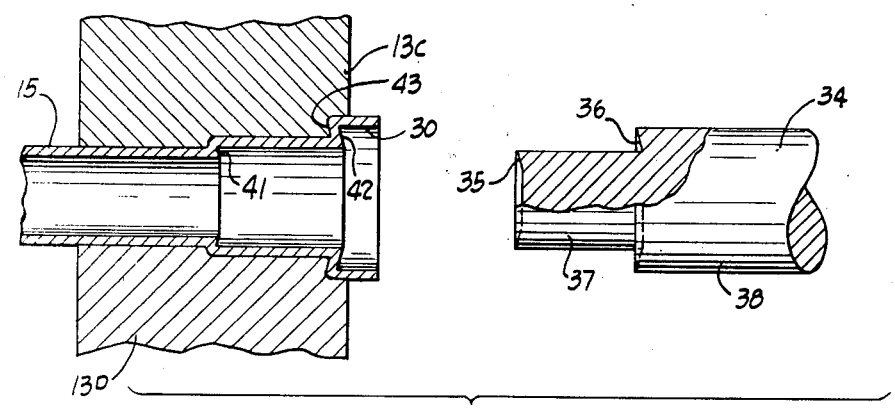
FIG. 2 is a longitudinal sectional view showing the use of a second mandrel for further shaping.

FIG. 2 shows the result of a second step in the operation which is not mandatory but is desired in this preferred embodiment. The first tube 15 may be still retained in the first die means 13A and 13B but preferably is gripped in slightly modified dies 13C and 13D. A second mandrel 34 is axially relatively moved by force means, not shown, into the enlarged end of the first tube 15, as shown in FIG. 1. The second mandrel 34 has an acute angled conical nose 35 and an acute angled shoulder 36 between a first portion 37 of the mandrel and an enlarged second portion 38 of this mandrel 34. The acute angled nose 35 acts on the first shoulder 28 of the first tube 15 to provide a reversely sloped first shoulder 41. The acute angled shoulder 36 of the mandrel 34 acts on the second shoulder 31 of the tube 15 to provide a reversely sloped second shoulder 42. The first die means 13C and 13D has an enlarged shoulder cavity 43 as shown in FIG. 2 in order to accommodate the rearward movement of the second enlarged portion 30 of the tube 15 in the formation of this reversely sloped second shoulder 42. If the die means 13A and 13B is used in FIG. 2 also, it may have this enlarged cavity 43. Since the percentage enlargement at the first enlarged portion 29 is not as great, it is usually not necessary to provide an enlarged shoulder cavity at the junction between the first enlarged cavity 17 and the main jaw cavity 19 of the first die means 13A and 13B.

FIG. 3 shows the first tube 15 still clamped in the first die means 13C, 13D and with the second tube 16 clamped in the second die means 14. This second die means includes first and second die halves 14A and 14B each with a generally semicylindrical jaw cavity 46 to be clamped onto and securely grip the tube 16.

FIG. 4 shows another step in the method of assembly of the tube joint 11, namely, when the first and second die means 13 and 14 are relatively moved together by some force means, not shown. The second die means 14 has an annular recess 47 on the front face 48 thereof. FIG. 4 shows that the die means 13 and 14 have been moved together until they almost touch. By this relative advancing axial movement, the end 50 of the second tube 16 has entered the first enlarged portion 29 of the first tube 15. Preferably this is a slip fit with a small clearance in the order of 0.002 inches to 0.015 inches. The end 50 of the second tube 16 has engaged the first shoulder 41 of the tube 15 as an abutment or stop. The reverse slope of this first shoulder assures a positive stop of the second tube 16 so that the tube does not tend to extrude into the main body portion 27 of the first tube 15 by being reduced in diameter. This is an advantage of also using the second mandrel 34 instead of just the first mandrel 20.

FIG. 4 further shows that the second tube 16 has been advanced sufficiently far into the first tube 15 so that an annular first portion 51 has bulged outwardly forming an annular bead 54. In a preferred embodiment, annular first and second portions 51 and 52, respectively, of the inner wall 53 of the second tube 16 are bulged outwardly causing radial expansion of an annular bead 54 on this second tube 16. This annular bead is permitted to form within the second enlarged portion 30 of the first tube 15.

Continued relative axial movement between the grasped tubes 15 and 16 causes the annular first and second portions 51 and 52 to be compressed into mutual engagement, as shown in FIG. 5. These annular portions are very tightly compressed longitudinally and radially and confined in this second enlarged portion. The annular bead 54 shown in FIG. 5 is contained by and acts against the second enlarged portion 30 of the first tube 15. In a preferred embodiment, the longitudinal depths of the combined cavity 43 and recess 47 is about 75% of the total four wall thicknesses therein. If 0.035 inch wall thickness aluminum tube is used, for example, the total longitudinal depth is about 0.105 inches. The very great compressive forces of this annular bead 54 act on the reversely sloping shoulder 42 and force it somewhat radially inwardly as an interlocking ring 55. This ring 55 is annular and of a smaller diameter than the outside diameter of the end portion 56 of the second tube 16. A junction line 57 is annular and is the junction between the first and second annular portions 51 and 52.

In cutting a complete tube joint into two longitudinal half sections, if the tube 16 is clean and uncorroded, usually this junction line 57 is not visible. It would be visible if the tube had first been painted black on the inside, if the inner tube wall is corroded, or if the tube joint 11 is etched with acid after sectioning. However, usually with the unaided eye such junction line 57 is not visible. The interlocking ring 55, being of smaller diameter than the end portion 56, provides a mechanical interlocking to withstand an axial withdrawal force of the tube 16 relative to the tube 15. Thus the tube joint is mechanically strong for both mechanical forces and fluid pressure forces.

The end 32 of the first tube 15 is shown as having entered the annular recess 47 in the second die means 14 and deformed radially inwardly around a part of the annular bead 54. This has the further desirous effect of the twin advantages of a better mechanical locking against axial and torsional forces and a better fluid tight seal. The fluid tight seal occurs in many places between the two tubes 15 and 16. In the step of the method of assembly as shown in FIG. 4, the beginning of the axial compression of the tube 16 initially causes radial expansion of the end portion 56 of the second tube 16. This radial expansion means that the end portion 56 is radially outwardly forced against the first enlarged portion 29 and is restrained thereby. The seal can take place at the reversely sloping first shoulder 41, because of the acute angle of this shoulder biting into the end 50 of the second tube 16. The fluid tight seal can also take place at the cylindrical surface between the radially expanded end portion 56 of second tube 16 and the first enlarged portion 29 of the first tube 15. Another place where an effective fluid tight seal is produced is at the interlocking ring 55. The sharp annular reversely sloped shoulder 42 digs into the annular bead 54 with a very great force and thus a good fluid tight seal is obtained at this area. Still further a fluid tight seal is effectively formed where the annular bead 54 has been expanded radially outwardly against the second enlarged portion 30 of the first tube 15.

Figure 6:
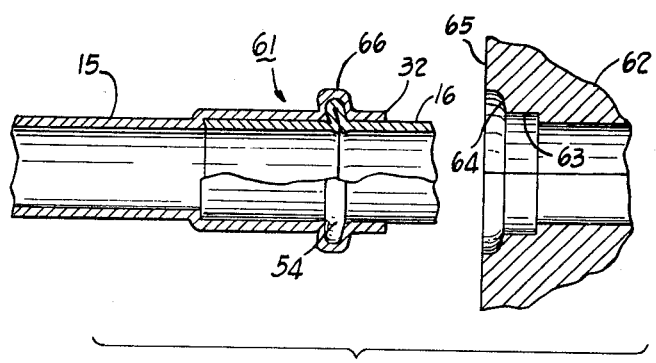
FIG. 6 is a longitudinal sectional view of a completed tube joint modified from that shown in FIG. 5.

FIG. 6 shows a further modification of the invention showing a tube joint 61. Much of this may be the same and constructed by the same method as for the tube joint 11 of FIGS. 1–5. A difference is that the first tube 15 is grasped by the first die means 13 so that the end 32 initially protrudes slightly further from the front face 26 of the die means 13. Also die means 62 are used to grasp the second tube 16. This second die means 62 has a first enlarged portion 63 and a second enlarged portion 64 closer to the front face 65 of the die means 62. The sequence of operation is essentially the same as that shown for FIGS. 1–5. FIG. 4 shows the two die means nearly closed and in that condition the end 32 of the first tube 15 engages the second enlarged portion 64 of the second die means. This forces this tube end 32 radially inwardly to cause this tube end to enter the first enlarged portion 63. The diameter of this latter portion is sufficiently small to cause the forward end of the tube 15 to lie closely adjacent or contiguous with the main body of the second tube 16. When the dies 13 and 62 completely close, as in FIG. 5, then the annular bead 54 is completely formed and is also completely encased in the enveloping shroud 66 of the first tube 15. This adds considerably to the strength of the tube joint 61 both mechanically and fluid pressure resisting strength.

Figure 7:
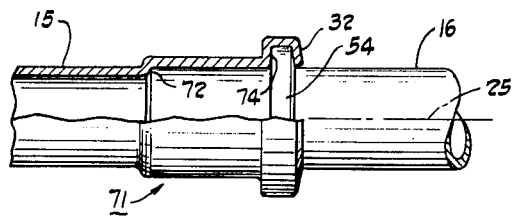
FIG. 7 is a longitudinal sectional view of a still further modification.

FIG. 7 shows a further embodiment of the invention in a tube joint 71. This is a simpler joint construction because the step of using the second mandrel 34 of FIG. 2 may be omitted. Referring to FIG. 1, where the first shoulder 28 may be made at a sufficiently steep angle, for example, about 60 degrees relative to the axis 25, then it often has been found unnecessary to make this shoulder perpendicular to the axis or the reversely sloping shoulder 41 of FIG. 2. It has been found that this 60 degree angle of FIG. 7 for the first shoulder 72 is sufficient to form a reliable stop for the second tube 16 so that it will not extrude into the first tube 15 in the steps of FIGS. 4 and 5. Also as shown in FIG. 1 the mandrel 20 may be fitted with a collar 73 which abuts the forward end 32 of the first tube 15 and pushes this tube rearwardly into the first die means, which may have a right angle cavity rather than the sloping cavity 18 or the reversely sloped shoulder cavity 43. This makes the second shoulder 74 change from this sloping second shoulder 31, shown in FIG. 1, to be substantially perpendicular to the axis 25. The annular bead 54 is formed in the same way as in FIGS. 4 and 5 and the forward end 32 of the first tube 15 is still forced radially inwardly by the second die recess 47 to provide a mechanical lock around the annular bead 54 for good mechanical strength and fluid pressure tightness.

Figure 8:
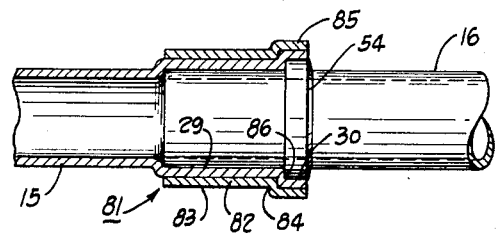
FIGS. 8 and 9 are longitudinal sectional views of two further modifications with reinforcing sleeves.

FIG. 8 shows a further modification of a tube joint 81 in this case with a reinforcing sleeve 82. The tubes 15 and 16 may be of aluminum, for example, and the sleeve 82 may be made of steel for extra strength of this joint 81. The sleeve 82 has a main body portion 83, a first shoulder 84 and first enlarged portion 85. The sleeve 82 may be formed in this particular shape at the time as forming the similar shapes on the first tube 15, e.g. the forming step of FIG. 1. Alternatively, the reinforcing sleeve 82 may be first formed in a separate forming operation by die and mandrel means similar to that shown in FIG. 1, and then subsequently may be placed in a suitably sized cavity in the first die means and then a first forming mandrel similar to mandrel 20 may be used to expand outwardly the first and second enlarged portions 29 and 30 of the first tube 15 to fit within the main body portion 83 and the first enlarged portion 85 of the sleeve 82. A square shoulder 86 may be formed on the tube 15 in the manner shown for FIG. 7, or it may have the reversely sloping shoulder 41 of FIG. 2. Again the annular bead 54 is formed in the second tube 16 and is restrained not only by the second enlarged portion 30 but by the first enlarged portion 85 of the reinforcing sleeve 82. This adds considerably to the mechanical strength of the entire tube joint 81.

Figure 9:
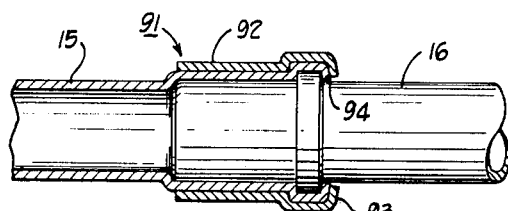

FIG. 9 shows a further embodiment of a tube joint 91 again utilizing a reinforcing sleeve 92 to reinforce this joint of the tubes 15 and 16. The sleeve 92 is similar to the sleeve 82 of FIG. 8, however the sleeve 92 has an inturned nose 93 engaging an inturned nose 94 on the end of the first tube 15. These inturned noses 93 and 94 may be formed in the manner shown for the tube joint 11 of FIGS. 1-5, providing suitable recesses for the reinforcing sleeve in the first die means and providing a suitable annular recess in the front face of the second die means 14, similar to recess 47 shown in FIG. 3.

Figure 10:
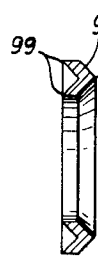
FIGS. 10, 11 and 12 are longitudinal sectional views of different seal rings.
Figure 11:
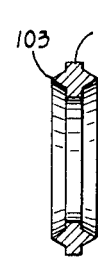
Figure 12:
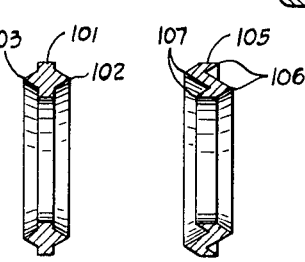

FIG. 10 illustrates a seal ring 97 which has a sharp forward annular shoulder 98 and two rearward sharp annular shoulders 99. FIG. 11 shows a modified seal ring 101 which has a sharp forward annular shoulder 102 and a sharp rearward annular shoulder 103. FIG. 12 shows a further seal ring 105 having sharp forward annular shoulders 106 and sharp rearward annular shoulders 107.

Figure 13:
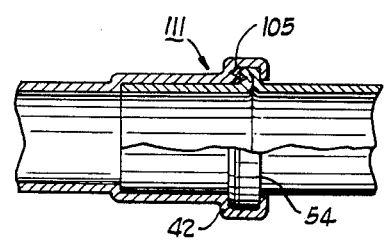
FIG. 13 is a longitudinal sectional view of a modification incorporating a seal ring; and, FIGS. 14 and 15 are longitudinal sectional views showing the sequence of steps in the method of assembly of a further modification.

FIG. 13 shows another modification of the invention and illustrates a tube joint 111 which incorporates one of the seal rings. As shown, the seal ring 105 of FIG. 12 is incorporated in this tube joint 111. This tube joint is quite similar to that of FIGS. 1-5 and may be formed by the method steps illustrated by these FIGS. 1-5 with minor changes. After the steps of FIGS. 1, 2 and 3 are performed, the seal ring such as seal ring 105 may be placed over the end 50 of the second tube 15, or may be placed within the second enlarged portion 30 of the first tube 15. Then when the steps of FIGS. 4 and 5 are performed, the seal ring 105 will be embedded between the annular bead 54 and the second shoulder 42. The forward and reverse annular sharp shoulders 106 and 107 bite into the annular bead 54 and the second shoulder 42, respectively, and thus provide an even more effective fluid seal means. The second shoulder 42 need not be reversely sloped as shown in FIGS. 1-5, it may be generally perpendicular as shown in FIG. 7, or may be even somewhat forwardly sloped.

Figure 14:
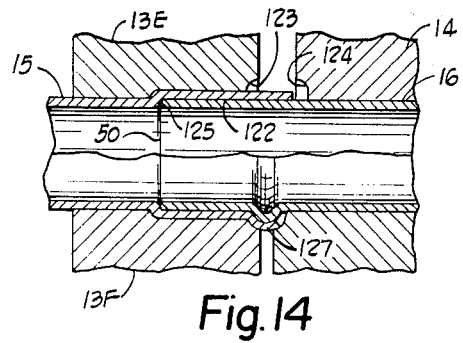
Figure 15:
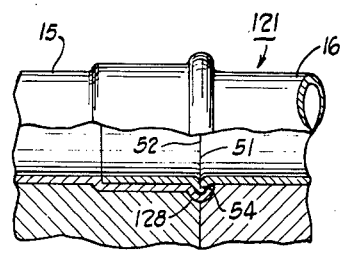

FIGS. 14 and 15 show a still further embodiment of the invention of a tube joint 121. FIG. 14 shows that the first tube 15 is gripped by first die means 13E and 13F and the second tube 16 is gripped by second die means 14. A mandrel such as a simplified mandrel 20 of FIG. 1 with only the first enlarged portion 21 may be used to form a first enlarged portion 122 in the first tube 15, but with no second enlarged portion. The first die means 13 has an annular cavity 123 and the second die means 14 has an annular cavity 124. The upper half of FIG. 14 shows the end of the second tube 16 as advanced within the enlarged first portion 122 of tube 15 until the end 50 of the second tube strikes the first shoulder 125 on the first tube 15. Continued advancing movement of the two dies is shown in the lower half of FIG. 14 and this advancing movement radially expands both tubes 15 and 16 to form a partial bead 127. Continued advancement of the two dies until the front faces thereof meet will produce the final tube joint 121 shown in FIG. 15. In this construction the inner second tube 16 has had two radially expanded annular portions 51 and 52 expand and compressed into mutual engagement to form the annular bead 54 which is encased and compressed within an annular bead 128 formed in the end of the first tube 15. This bead may be quite similar to that shown in FIG. 5, or alternatively may be similar to that shown in FIG. 6 or 7. If a shouldered reinforcing sleeve is first disposed in the dies, then the completed tube joint may be similar to that shown in FIG. 8 or 9.

The preferred dimensions of the various apertures in the tube joints 11, 61, 71, 81, 91, 111 and 121 depend upon the specific use, type or material of tubes, tube diameter and tube wall thickness. Industry standards permit 0.004 inches tolerance in the outer diameter of the tube, so usually the diameter of the inner wall of the first enlarged portion 29 is four to six thousandths of an inch larger than the tube diameter, to permit a slip fit. The diameter of the inner wall of the second enlarged portion 30 has a nomical size of the outside diameter of the tube 16 plus twice the tube wall thickness. The axial length of this second enlarged portion 30, as shown in FIG. 2, is about 1½ or 2 times the tube wall thickness. The axial length of the first and second enlarged portions 29 and 30; namely, how far the tube 16 is inserted into the tube 15, is preferably a minimum of the tube outside diameter plus twice the tube wall thickness. Inserting the tube 16 further into the tube 15 generally produces a stronger tube fitting because of the longer overlap.

The fitting has been successfully used on copper, steel and aluminum tubes, and mixtures of these materials. The following table A shows typical dimensions which have been used satisfactorily for aluminum tubing;

TABLE A

| Tube O. D. | .125" | .188" | .250" | .375" |
| --- | --- | --- | --- | --- |
| I.D. of portion 29 | .127/.131 | .187/.191 | .252/.256 | .377/.381 |
| I. D. of portion 30 | .173 | .250 | .313 | .500 |
| axial length of portion 30 | .035 | .050 | .050 | .050 |
| axial length of 29 + 30 | .198 | .200 | .334 | .325 |

Each of the tube joints 11, 61, 71, 81, 91, 111 and 121 disclosed provides a unique seal arrangement to assure a fluid tight seal. The construction of FIG. 1, for example, has survived rigorous tests. The tube joint will withstand 2,000 psi fluid pressure and will also withstand vibration testing and severe temperature change tests. One such test passed by this tube joint is to have the tube joint immersed in a liquid at $-359°$ F. and then suddenly plunged into heated oil at $+212°$ F., then another 1,000 cycles of vibration. As disclosed in my parent application Ser. No. 425,561 the annular bead 54 makes a good fluid tight seal with the inwardly facing wall 30 of the first tube 15. The interlocking ring 55, being initially sharp edged, digs into the annular bead and provides a good fluid tight seal at this annular area. The inturned end 32 of tube 15 mechanically locks the joint together and makes doubly sure that the fluid tight seal will remain despite severe changes in temperature, pressure and vibration.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of making a tube-to-tube joint directly between a first tube and a cylindrical end of a second tube, and utilizing mandrel means and first and second die means, comprising the steps of:
   grasping the first tube with the first die means;
   moving the mandrel means and the first die means relatively axially together to form in one end of the first tube a radially enlarged first portion and to form a first shoulder at the junction between said enlarged first portion and the main body of the first tube;
   said enlarged first portion having an inner diameter slightly larger than the nominal outside diameter of one cylindrical end portion of the second tube;
   removing the mandrel means;
   grasping the second tube at said one cylindrical end portion thereof with the second die means;
   relatively axially moving together the grasped portions of the tubes to cause said end of the second tube to enter said enlarged first portion of the first tube and to abut and have movement arrested at said first shoulder and continued axial relative movement of the grasped portions of the tubes causing first and second annular portions of the inner wall of the second tube to bulge outwardly from a cylindrical shape to form an annular bead;
   forming in said first tube a second enlarged portion closer to said one end than said first enlarged portion and a second shoulder between said first and second enlarged portions;
   continued relative axial movement between the grasped portions of the tubes causing said first and second annular portions of the inner wall of the second tube to be compressed into mutual engagement;
   continued relative axial movement between the grasped tubes establishing fluidtight seal means between said annular bead of the second tube and said second shoulder of the first tube; and
   said fluidtight seal means capable of withstanding pressures of several atmospheres.

2. The method as set forth in claim 1, wherein the mandrel means forms said first shoulder as a reversely sloping shoulder to form a positive stop for said end of the second tube.

3. The method as set forth in claim 1, including providing a reinforcing sleeve inside said first die means and around the first tube at least at said first enlarged portion.

4. The method as set forth in claim 3, wherein said reinforcing sleeve is radially inwardly deformed to engage said second enlarged portion of said first tube substantially at said annular bead.

5. The method as set forth in claim 1, wherein the mandrel means forms a reversely sloping second shoulder on the first tube.

6. The method as set forth in claim 5, wherein said continued relative axial movement of the grasped tubes forces said second shoulder to be deformed radially inwardly and to deform radially inwardly an annular portion of the second tube.

7. The method as set forth in claim 1, including forming said second shoulder by said relative axial movement.

8. The method as set forth in claim 1, wherein the first die means radially support said second enlarged portion of the first tube to establish said fluidtight seal means between the annular bead and the inner wall of said second enlarged portion.

9. The method as set forth in claim 1, wherein the second die means co-acts with said one end of the first tube to deform it inwardly to entrap said annular bead within said second enlarged portion.

10. The method as set forth in claim 1, including providing a reinforcing sleeve inside said first die means and surrounding said first and second enlarged portions.

11. The method as set forth in claim 10, wherein said second die means engages the end of said reinforcing sleeve to force it radially inwardly to entrap said annular bead.

12. The method as set forth in claim 1, wherein the second die means acts on said second enlarged portion of the first tube during said continued movement and radially inwardly deforms said second enlarged portion to cause it to lie in engagement with the main body of the second tube.

13. The method as set forth in claim 1, including providing a seal washer axially compressed between said annular bead and said second shoulder.

14. The method of making a tube-to-tube joint directly between first and second tubes, and utilizing mandrel means and first and second die means, comprising the steps of:
   grasping the first tube with the first die means;
   moving the mandrel means and the first die means relatively axially together to form in one end of the first tube radially enlarged first and second portions with a first shoulder at the junction between said enlarged first portion and the main body of the first tube and with a second shoulder at the junction between said enlarged first and second portions;
   said enlarged first portion having an inner diameter slightly larger than the nominal outside diameter of one cylindrical end portion of the second tube;
   removing the mandrel means;
   grasping the second tube at said one cylindrical end portion thereof with the second die means;
   relatively axially moving together the grasped portions of the tubes to cause said end of the second tube to enter said enlarged first portion of the first tube and to abut and have movement arrested by said first shoulder and continued axial relative movement of the grasped portions of the tubes causing first and second annular portions of the inner wall of the second tube to bulge outwardly from a cylindrical shape to form an annular bead;

continued relative axial movement between the grasped portions of the tubes causing said first and second annular portions of the inner wall of the second tube to be compressed into mutual engagement;

continued relative axial movement between the grasped portions of the tubes establishing fluidtight seal means between said annular bead of the second tube and said second shoulder of the first tube; and said fluidtight seal means capable of withstanding pressures of several atmospheres.

* * * * *